Oct. 9, 1951  G. A. LYON  2,570,255
WHEEL COVER
Filed July 6, 1946  2 Sheets-Sheet 2
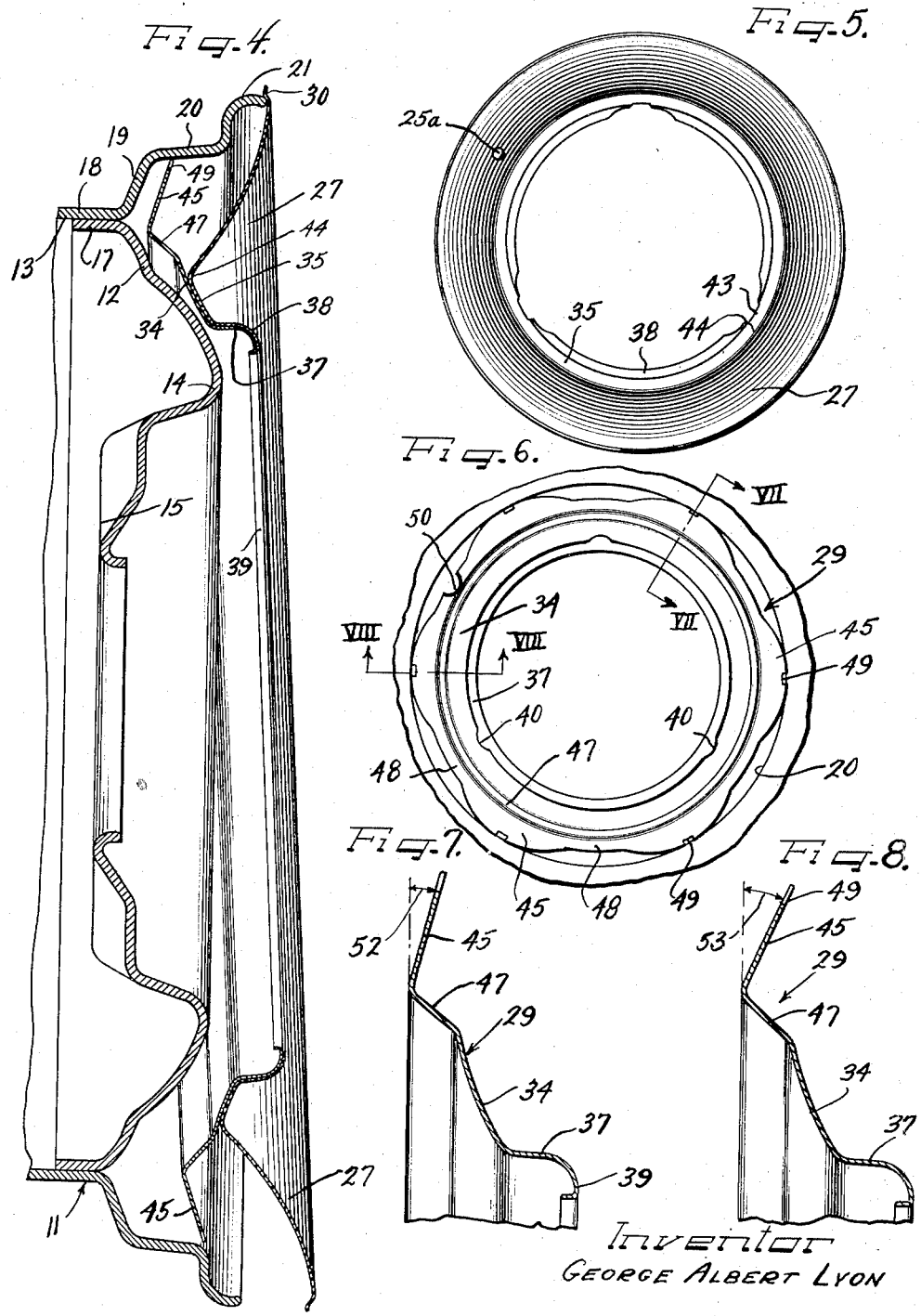
Inventor
GEORGE ALBERT LYON
by The Firm of Charles W. Hill
Attys.

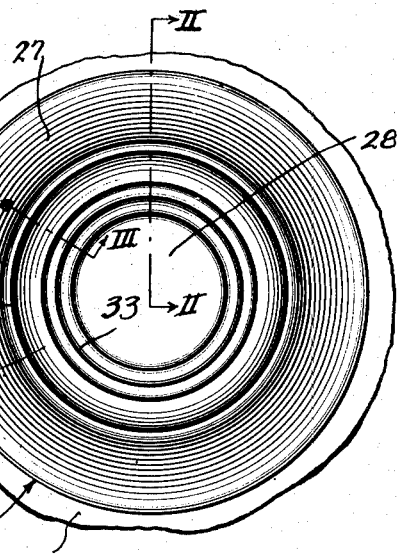
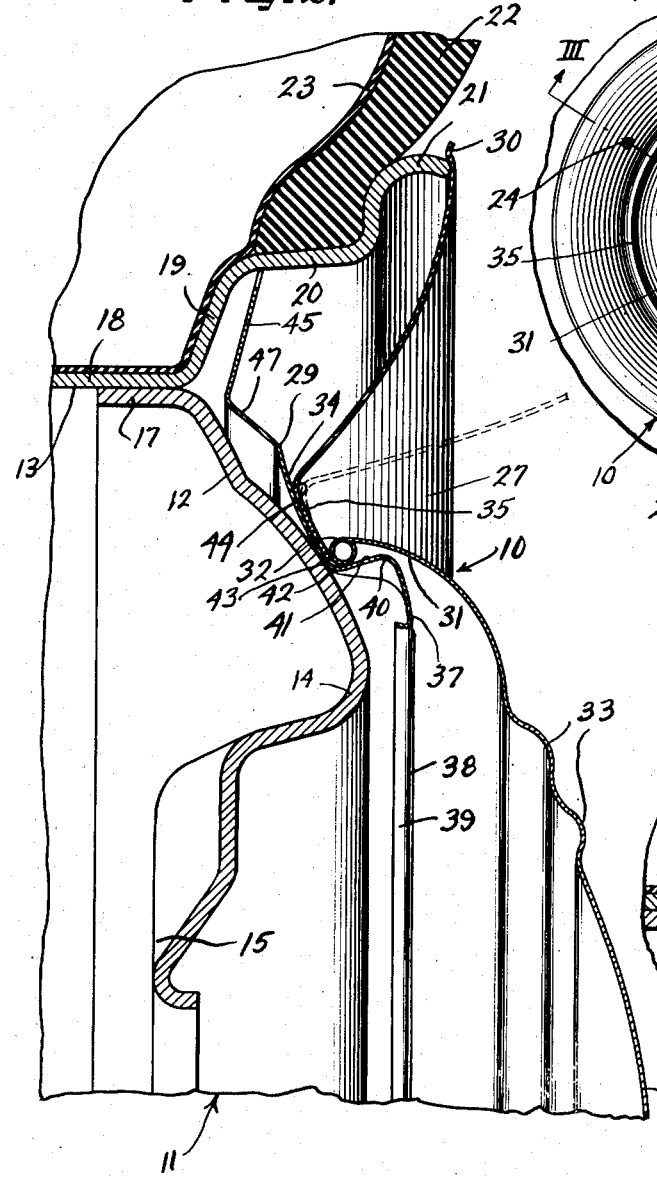

Patented Oct. 9, 1951

2,570,255

UNITED STATES PATENT OFFICE 2,570,255

WHEEL COVER

George Albert Lyon, Allenhurst, N. J.

Application July 6, 1946, Serial No. 681,700

10 Claims. (Cl. 301—37)

This invention relates to improvements in wheel structures including ornamental and protective cover means.

The modern trend in automobile wheel design has been toward larger tires and smaller wheels. As the load-bearing part or spider of the wheel has been reduced in size in conformity with the trend toward smaller wheels, the problem of attaching ornamental cover structure to the wheel has become proportionately more serious due to the limitation placed upon the area available for fastening the cover in place.

Various clip arrangements have been proposed and, in numerous instances, used with considerable success. However, clips require mounting perforations or openings in the wheel body or spider part and such openings have a tendency to weaken the spider or wheel body, where the area of the body is reduced to the small proportions of the current trend.

An especial problem arises in applying ornamental and protective wheel covers to existing vehicle wheels of the relatively small size mentioned. This is especially true where the wheel body has no openings of any kind which can be used for receiving attachment clips, or where the wheel body lacks any sort of protuberances or bumps suitable for receiving attachment means of a cover structure.

It is accordingly an important object of this invention to provide a new and improved ornamental and protective cover structure for small size automobile wheels and the like which is readily adaptable to existing wheels and which can be easily and quickly applied without altering the existing wheel structures.

A further object of the invention is to provide a novel wheel cover having a self-equalizing tensioned attachment with the wheel structure.

Still another object of the invention is to afford means for attaching a cover to a wheel structure in such a manner that, even though it may be convenient to apply the cover structure in cocked relation to the wheel in the initial registration of the cover with the wheel, as for example in the region of the valve stem, and then finally push the cover into coaxial relation to the wheel, a substantially perfectly uniform, concentric placement of the cover on the wheel is attained.

Another object of the invention is to provide a novel cover structure adaptable for application to an existing wheel and which, although retaining a thorough attached relationship with the wheel, is adapted to be readily and easily detached without damage either to the cover structure or the wheel.

It is also an important object of the invention to provide a wheel cover assembly wherein a plastic cover annulus affording a general simulation of a white tire side wall is mounted in an improved manner by means of cooperating metallic members including an attachment member and a hub cap member.

A still further object of the invention is to provide an improved wheel cover assembly wherein a cover-retaining and attaching device operatively supports not only a plastic outer cover annulus, but also a detachable hub cap in an improved manner assuring a tight, rattle-proof engagement of the cooperating parts and makes use of certain inherent resilient qualities in the component parts to the attainment of the desired results.

Another object of the invention is to provide an improved snap-on and pry-off attachment for a hub cap. In this connection, I take advantage of the tendency of a flexible hub cap edge to flex radially and axially inwardly intermediate spaced points of radially outwardly stretching engagement with attachment bumps on the attachment structure of the cover.

In accordance with the general features of this invention, there is provided in a wheel structure including a wheel body part and a tire rim, a wheel cover assembly including an outer plastic trim ring member supported by an attachment ring and clamped in place on the attachment ring by a flexible hub cap which engages snap-on bumps integrally formed in the attachment ring in such a manner as to stretch the flexible edge of the hub cap radially outwardly in substantially clover-leaf fashion so that the flexible hub cap edge intermediate the bumps draws radially and axially inwardly toward a shoulder provided therefor on the attachment member and thus clamps the inner marginal portions of the trim ring member against said shoulder and the adjacent body portions of the attachment ring, the plastic trim ring member, in turn, affording an anti-rattle cushion between the hub cap and the attachment member.

Another feature of the invention relates to the provision of the three-part ornamental and protective cover for a vehicle wheel of small diameter wherein the cover comprises a trim ring adapted to simulate and provide an apparent inward extension of the side wall of a tire and, where colored white, simulating a white side wall for the tire, and is supported by an attachment ring member which firmly but detachably engages with the wheel structure and affords generally radially disposed snap-on bumps for a hub cap of live resiliency and of slightly smaller edge diameter than the diameter around said bumps, so that when the hub cap is pressed home it stretches radially outwardly at the bumps and has the edge thereof intermediate the bumps deflected radially and axially inwardly against a relatively inwardly offset shoulder on the retaining member against which the inner marginal portion of the trim ring lies and is thereby clamped in place by the inwardly deflected edge portions of the hub cap.

A still further feature of the invention relates to the novel construction of the retaining ring member with a plurality of circumferential equidistantly spaced radially extending attachment fingers for effecting biting engagement with an axial flange of a tire rim, and wherein the fingers are disposed in varying angularity deviating obliquely outwardly from the radial plane so as to compensate for unequal deflection of the fingers as a result of cocking the cover initially into position on the wheel, as, for example, at the valve stem in mounting the cover on the wheel, thus attaining substantially equalized tension in the securing fingers when the cover is fully pushed axially into position on the wheel, and substantially perfect concentricity while avoiding any tendency toward skewing or popping off of the cover which might otherwise result from unequal tension in the securing fingers.

It is still another feature of the invention to provide the securing fingers of the attaching ring components of the cover assembly with biting edges that are rounded circumferentially and are notched to receive a pry-off tool so that, although the fingers engage with adequate biting action with an axial flange of the tire rim of the wheel, they can be readily disengaged by means of a pry-off tool such as a screw driver from the front of the wheel when it becomes necessary or desirable to do so, thus rendering the cover especially suitable for use with wheels having no openings by which access to the cover can be had from the rear of the wheel.

Other objects, features, and advantages of this invention will be fully apparent from the following detailed description of a preferred embodiment of the invention, taken in connection with the accompanying two sheets of drawings and in which:

Figure 1 is a fragmentary side elevational view of a wheel structure embodying the features of this invention;

Figure 2 is an enlarged radial sectional detail view taken substantially on the line II—II of Figure 1;

Figure 3 is an enlarged radial fragmentary detail sectional view taken on substantially the line III—III of Figure 1;

Figure 4 is a diametrical sectional view through the wheel structure and the assembled trim ring and attachment ring components of the wheel cover, showing the cover in process of being applied to the wheel structure;

Figure 5 is a side elevational view of the trim ring member of the wheel cover;

Figure 6 is a side elevational view of the attaching ring component of the cover structure;

Figure 7 is an enlarged fragmentary radial detail view taken substantially in the plane of line VII—VII of Figure 6; and Figure 8 is a fragmentary enlarged radial detail view taken substantially in the plane of line VIII—VIII of Figure 6.

As shown on the drawings:

A wheel cover 10 is adapted to be mounted upon a wheel 11 for an automobile or the like and comprising a load-bearing body part 12 circumferentially supporting a tire rim 13. The wheel 11 is of a usual construction and is of relatively small diameter in conformity with current small size trends.

The wheel body 12 may be a relatively heavy gauge sheet metal stamping formed with an annular axially outwardly bulged nose portion 14 which acts as a rigidifying corrugation. From the nose portion the wheel body recedes rather sharply axially and radially inwardly to a central bolt-on flange 15. Radially outwardly of the bulging nose portion 14, the wheel body recedes on a generally long radius arc radially outwardly and axially inwardly to a rim supporting axial flange 17.

The tire rim 13 is preferably of the drop-center type and has a base flange 18 secured to the body flange 17 as by welding or the like. At each side of the base flange 18 (only one side being shown here), the tire rim has a generally radially extending flange 19 which merges on a radius with an intermediate generally axially extending flange 20 having its outer margin merging with a generally radially outwardly and axially outwardly curving terminal flange portion 21.

Received within the tire rim 13 is a pneumatic tire 22 equipped with an inner tube 23 having a valve stem 24 protruding through a valve stem aperture 25 in the outer tire rim side flange 19.

It will be appreciated, of course, that by reason of the bulgingly reinforced construction of the load-bearing body member 12 of the wheel, it is structurally characterized to be capable of fully withstanding even the most severe road conditions, although it is of relatively small size. Due to the great stresses or strains to which the body member 12 is subjected, and especially due to the relatively small over-all area of the body member, any holes or apertures such as might be provided for accommodating securing clips for cover parts are undesirable, due to the weakening effect thereof upon the body. This is especially true of the rigidifying bulge 14 which is obviously one of the more stressed portions of the body part and is relied upon, to a large extent, to resist distorting strains and stresses in the wheel under road conditions during operation of the associated vehicle.

It is customary, and to a large extent necessary, to afford protection for the central or bolt-on flange portion 15 of the body member as by means of a hub cap or the like, and for the sake of appearance as well as protection of such structure as the valve stem 24, wheel-balancing weights, and the like, it is also highly desirable to provide cover structure for the tire rim 13 and the intervening relatively deeply channeled space between the tire rim and the body part.

All of this is accomplished by the cover 10, and without the need for any apertures or perforations or openings of any kind in the wheel body member 12, or even any special formation thereof in order to accomplish attachment of the cover to the wheel. For this purpose, the cover 10 preferably comprises a three-part assembly including an outer trim ring 27, a hub cap member 28, and an attaching ring member 29 with which the trim ring and hub cap members are assembled detachably.

The trim ring 27 is preferably of such size and configuration as to conceal the tire rim 13 and afford a simulation of a tire side wall, to appear in use as a generally radially inward continuation of the side wall of the tire 22 and, where colored white, gives the impression of a white side wall for the tire. Accordingly, the trim ring 27 is formed on a curved cross section outwardly bowed or concavo-convex in form and extends from slightly beyond the outer edge of the tire rim extremity portion 21 curvingly axially and radially inwardly to adjacent the wheel body the channel between the wheel body 12 and the tire rim 13 so that the biting fingers 45 can engage virtually the axially inner extremity of the opposing face of the tire rim intermediate flange 20. This assures that the gripping fingers 45 will not accidentally dislodge from the tire rim flange 20 since the major area of the opposing face of the flange affords gripping surface for the fingers. Moreover, since the tire rim flange 20 customarily tapers inwardly to a smaller diameter, maximum biting tension is attained for the fingers 45 by causing them to be driven far inwardly into gradually increasing tensioned relation along the tire rim flange in the placement of the cover.

Resilient radially outward tension tending to drive the fingers 45 into strong biting engagement with the tire rim flange 20 is enhanced by the oblique disposition of the flange 47 which, for this purpose serves in the nature of a spring backing for the biting fingers normally resisting radially inner movement of the fingers and being placed under tension as a result of the radially inward compression of the retaining fingers upon being driven into place along the inwardly narrowing or substantially frusto-conical surface of the tire rim flange 20.

The oblique disposition of the fingers 45, of course, renders them somewhat flexible, especially at the juncture with the flange 47 so that they may yield slightly swingably axially outward upon being urged home into biting engagement with the tire rim flange 20 in the mounting of the cover. The tendency of the fingers 45 is, of course, at all times to resume the original position and this, together with the resilient radial pressure afforded by the flange 47, causes these fingers to assume a strong biting engagement with the tire rim flange.

Strength or rigidity in their plane is assured in the biting fingers 45 by their relatively great width, and further by the connecting flange webs 48.

By having the edges of the biting fingers 45 rounded on relatively large radius as shown, the structure is rendered quite adaptable to the surrounding annular surface of the tire rim flange 20 irrespective of any irregularities that may be present therein. Furthermore, the rounded edges of the biting fingers limit the biting engagement of the fingers with the tire rim flange and thus reduce frictional resistance to forcing the fingers home into biting engagement.

In addition, the rounded edges of the biting fingers facilitate disengagement of the fingers from the tire rim flange 20 when it is desired to remove the retaining ring member 29 from the wheel. To facilitate such removal, each of the fingers 45 is preferably notched out as indicated at 49 at the center of its biting edge to accommodate a pry-off tool such as a screw-driver which may be inserted therethrough and deflect the engaged finger away from the tire rim, or at least loosen it sufficiently to permit its axially outward withdrawal. This withdrawal may, of course, have to be effected progressively in conjunction with the similar dislodgement and withdrawal of the companion biting fingers 45.

In order to accommodate the valve stem 24, one of the web flange portions 48 may be notched out as indicated at 50 (Figures 3 and 6). The edge defining such notch may be formed with a reinforcing flange 51 which also serves as a smooth edging opposing the valve stem 24 and avoiding any danger of sharp edges at the notch 50 cutting into the valve stem.

An important function of the valve stem notch 50 resides in providing an index for use in mounting the cover upon the wheel. This is especially desirable where the trim ring portion 27 of the cover is provided with the valve stem clearing aperture 25a and which is disposed in registry with the valve stem notch 50 to receive the valve stem when the cover is mounted.

Moreover, it is virtually a normal action on the part of the average person in mounting one of these covers 10 to start the same in at an angle, or cocked, as indicated in Figure 4 rather than pushing it into place in a truly axial direction. Such tilted or cocked initial placement of the cover causes an adjacent pair of the biting fingers 45 to make initial contact with the tire rim flange 20 at or close to the final point of respective biting contact with the tire rim flange and does not permit such fingers to flex axially outwardly as would normally be the case where they are driven progressively inwardly along the tapering surface of the flange as in the case of the remaining biting fingers 45 as the cover is driven fully home, or as would be the case were the cover first disposed quite concentric with the wheel and then driven home in a truly axial direction.

Therefore, provision is made for compensating for the unequal or different tensioning to which the initial two biting fingers 45 are subjected in such cocked placement. In this respect, the valve stem notch 50 serves to compel the initial placement of the two biting fingers which flank the same, and these fingers are, as shown in Figure 8, formed at a greater oblique angle than the remaining fingers, as indicated in Figure 7. Hence, as the cover is tilted toward concentricity with the wheel after engagement of the stem notch flanking fingers 45, the latter, due to their biting engagement with the tire rim flange 20, deflect toward the normal angularity of the remaining biting fingers in rim engaging position. As a result, the resilient tension in all of the biting fingers, including the two fingers which were initially engaged with the tire rim, is substantially equal in the finally mounted engagement ring. This relieves the attaching ring from any substantial uneven tension and promotes a truly concentric mounted disposition thereof. It further avoids any tendency for any portion of the cover to jar loose due to any unusual strains in use.

In practice, it has been found desirable to afford an initial angularity of approximately 16½°, as indicated at 52 (Figure 7) in the biting fingers 45 other than the two which flank the valve stem notch 50. It has been found that, in the two biting fingers flanking the valve stem notch 50, a substantially greater angularity as indicated at 53 in Figure 8, to approximately 24°, very well answers the purpose.

From the foregoing it will be apparent that the present invention affords a wheel cover which is especially suitable for use with very small wheels, and more particularly with existing wheels. By means of the novel attaching ring structure in the cover assembly, which is self-securing, there is no need for providing any spaces between the wheel body and tire rim, or for providing any apertures or openings at any part of the wheel structure. Yet, all of the desirable features and advantages of a removable hub cap and of a decorative and protective wheel trim structure, are attained. In addition, the novel cover assembly affords many other advantages and improved features contributing to the compact, simple, and efficient construction of the

I claim as my invention:

1. In a wheel structure of the character described, a trim ring member, a hub cap member having a flexible margin, and an attaching ring member having means for securing it to a wheel and formed with a shoulder engageable by said trim ring, said shoulder having radially projecting bumps including respective cam surfaces extending from the tips of the bumps generally radially and axially inwardly to juncture with the body of the attaching ring member and at the juncture defining generally radially outwardly opening groove portions offset from said shoulder and disposed on a circle having a diameter greater than that of said shoulder and engaged by said hub cap margin, said hub cap margin being of a smaller internal diameter than that of the circle of said groove portions and stretchable into snap-on engagement over said bumps, the portion of said hub cap margin intermediate the bump-engaged portions thereof being deflectable resiliently into clamping engagement with the portion of the trim ring engaging said shoulder.

2. In a wheel structure, an attaching ring member having a generally radially outwardly and axially inwardly extending body portion adapted to engage against the protruding annular nose portion of a wheel body and biting fingers extending radially from said body portion for engagement with an intermediate flange of a tire rim, a plastic trim ring member having a main body portion formed on a convex curvature for concealing the tire rim and affording a general simulation of the continuation of a tire side wall, said trim ring having an inner marginal flange of substantial width extending generally radially inwardly and slanting axially outwardly and seated upon the body of the attaching ring member, a hub cap having a resilient edge structure, and means on the inner margin of said attaching ring member for snap-on pry-off engagement by the resilient hub cap edge, the inner margin of the trim ring being disposed adjacent to said hub cap receiving means and being clamped against the attaching ring member by the hub cap, said marginal seating flange of the trim ring member having angular juncture with the body portion spaced radially outwardly from the hub cap edge and affording a spring hinge strucure adapting the trim ring to be deflected open by bending the same at said marginal flange.

3. In a cover structure for use with an automobile wheel having a tire rim and a load-sustaining body portion formed with an annular axially outwardly protruding nose affording a groove between the protruding nose and the tire rim, an attaching ring member having a body portion extending in a generally radial but obliquely axial direction and adapted to shoulder against the bulging nose portion of the wheel body, a more sharply oblique flange at the radially outer edge of said body portion, and a plurality of radially and axially outwardly oblique biting fingers extending from said flange for engagement with the intermediate axially extending flange of the tire rim, the radially inner margin of said attaching ring being formed to receive a hub cap in snap-on pry-off relation, and said body adjacent to said inner marginal portion being adapted to receive a trim ring to be clamped thereto by the hub cap, said biting fingers having web flange portions connecting the same in the plane thereof and affording substantial rigidity in the plane of the fingers, said oblique flange affording resilience permitting radial inward yielding of the biting fingers when mounting the attaching ring on the wheel.

4. In a wheel cover, an attaching ring member having a plurality of generally radially extending biting fingers adapted for biting engagement with an axially extending intermediate flange of a tire rim, certain of said fingers being formed at a different angle than the remaining fingers to accommodate variance in deflection due to cocking placement of the attaching ring in mounting the same upon a wheel.

5. In a cover for a wheel structure including a tire rim having an intermediate generally axially extending flange, a circular attaching member having a plurality of radially extending generally axially outwardly angled biting fingers adapted to engage said tire rim flange for securing the attaching member to the wheel, certain of said fingers being formed at a greater axially extending angle than the remaining fingers and being thereby adapted for making initial biting contact with the tire rim flange by tilting the attaching member toward and then pushing the member into concentric relation to the tire rim for biting engagement with the rim flange by the remaining fingers.

6. In a wheel cover structure, a circular cover member, and a circular retaining member supporting said cover member and including a generally radially outwardly extending flange having a circumferential series of radially outwardly projecting fingers thereon adapted to engage with the flange of a tire rim in order to secure the cover structure to an automobile or like wheel, said flange having a notch therein adapted to index with a valve stem protruding through the tire rim, said notch being formed between a pair of said fingers, and said pair of fingers being disposed at a different angle than the remaining fingers so that in applying the cover structure to the wheel said pair of fingers may be applied initially to the tire rim while the retaining member is held in a cocked position and be deflected in the subsequent movement of the cover toward fully attached concentric relation to the wheel to assume a deflected condition common to the remaining fingers.

7. In a wheel structure including a tire rim and a body member secured together and providing an annular axially outwardly opening groove therebetween, said tire rim having an intermediate generally axially extending flange having the axially inner portion thereof adjacent to the bottom of the groove, a cover member for concealing the tire rim, an attaching ring member having means thereon for supporting said cover member and including a set of generally radially outwardly extending biting fingers disposed at an oblique axially outward angle and engaging with said inner portion of said intermediate flange, a pair of said fingers being disposed at an initially greater oblique axial outward angle than the remaining fingers and adapted in the fully assembled relation of the cover with the wheel to have the angularity thereof substantially equal to that of the remaining fingers.

8. In a cover structure including a cover member and a retaining ring structure therefor, said retaining ring structure having generally radially outwardly extending fingers adapted to engage with a wedging biting action against an intermediate generally axially extending flange of member 12 within the annular channel provided between the intermediate flange 20 of the tire rim and the nose portion 14 of the body member. At its outer edge, the trim ring member 27 may be slightly turned as at 30 so as to overhang the outer edge of the tire rim flange 21 in relatively close proximity to the curved outer side wall of the tire 22.

Any suitable material may be used for the trim ring 27 such, for example, as stamped strip or sheet steel, molded plastic, or the like, but, for most purposes, a synthetic plastic such as ethyl or cellulose acetate, or vinyl resin, is preferred. When made of such a plastic, the trim ring is quite form sustaining but, at the same time, is highly flexible, so that it is far less liable to damage from indentation by blows thereagainst than a more rigid material such as metal, while at the same time it can be readily manipulated for access therebehind for cleaning, or to reach the wheel weights or other structure concealed thereby, and yet will always return back to its original shape when released from its opening deflection.

Where the valve stem 24 is relatively short so that the trim member 27 will clear the end thereof access may be had to the stem by manually deflecting the cover open. Where the valve stem is of such length as to extend beyond the trim member a valve stem aperture 25a is preferably provided. This aperture may have an inwardly directed reinforcing flange thereabout.

The hub cap 28 is preferably of an especially live, resilient construction formed on a relatively large radius throughout its major expanse and having an annular rim portion 31 of shorter radius terminating in a round inturned reinforcing and attachment bead 32. A thin, tough, resilient steel is a very desirable, and preferred, material from which to make the hub cap 28, but it can also be made advantageously from suitable plastic material characterized by adequate toughness and resiliency. By preference, one or more concentric annular reinforcing deformities or ribs 33 are formed intermediate the central and outer marginal portions of the hub cap.

Both the trim ring member 27 and the hub cap member 28 are carried by the attaching member 29 detachably and in such manner that the hub cap member can be readily pried off when necessary to gain access to the bolt-on flange 15 and, when in place in the assembly, acts to clamp the trim ring member 27 to the attaching member 29. Accordingly, the attaching member 29 is formed with an annular slightly concavely curved generally radially outwardly and axially inwardly extending main body portion 34 affording an abutment against which a complementary annular marginal radially inwardly, axially outwardly extending flange portion 35 on the trim ring 27 is seated.

In order to receive and retain the hub cap 28 and afford a clamping cooperation of the hub cap with the trim ring 27, the attaching member 29 is formed with an inner marginal, axially outwardly extending and radially inwardly curving shoulder flange 37 which is internestingly embraced by a complementary inner marginal flange 38 providing the radially inner terminus of the seating flange 35 of the trim ring. At the base of the shoulder flange 37, the edge-reinforcing bead 32 of the hub cap 28 is adapted to clamp the contiguous portion of the trim ring 27 against the attaching member 29.

Sheet metal of suitable gauge and rigidity but yet amply resilient to serve the desired purpose, may be used for the attaching ring member 29. A narrow reinforcing flange 39 is preferably formed on the inner edge of the shoulder flange 37 by turning axially inwardly the extreme inner edge portion of such flange. This reinforcing flange 39 also serves as a smooth finishing edge defining the central opening through the attaching ring member 29 through which access is had to the wheel body depression including the bolt-on flange 15, and avoids any danger of injury to the hands of a person due to a possibly sharp inner edge on the attaching ring.

For snap-on, pry-off retention of the hub cap 28, the retaining ring shoulder flange 37 is formed with radially outwardly protruding rounded bumps 40. The radially outward extremities of the bumps 40, of which there are preferably three in number equidistantly annularly spaced, define a diameter which is appreciably greater than the inner diameter of the reinforcing and attaching bead 32 of the hub cap. Thus, in order to engage over the bumps 40, the hub cap bead 32 must deflect or stretch outwardly and this is permitted by the live resilience of the hub cap.

After the hub cap bead 32 has passed the radial extremities of the bumps 40, the resilient reaction of the stretching to which it is subjected causes it to snap axially inwardly along respective generally radially inwardly receding and axially extending cam shoulders 41 on the bumps and which define a generally radially outwardly, axially inwardly facing wall of a groove 42 which is reentrantly disposed at the base of each bump.

By having even the most reentrantly disposed portion of the groove 42 disposed in slightly radially outwardly spaced relation to the shoulder afforded by the shoulder flange 37 so that the reentrant portions of the grooves of all of the bumps 40 lie on a theoretical circumference of greater diameter than the shoulder 37, the hub cap bead 32 is held against contracting to its original circularity. As a result, a three-point stretch persists in the bead 32 and the contiguous portions of the hub cap, and this generates a resilient reaction in the portions of the hub cap intermediate the points of stretch or deflection. As a result, such intermediate portions of the bead 18 are driven hard toward the shoulder 37 by radial inward deflection, and, at the same time, axially inwardly toward the contiguous portion of the main body 34 of the attaching ring member.

With the intermediate portion of the bead 32 bottomed on the body 34 and the shoulder 37, the intermediate portions of the hub cap are substantially forced back to their original contour or form, and this sets up a counter-reaction at and adjacent to the points where the bead 32 engages the bumps 40. Consequently, the bead draws hard radially inwardly and tends to pull axially outwardly along the cam faces 41 and into slightly spaced relation to the body 29 of the ring member at the reentrant groove 42. This condition is well shown in Figure 2, whereas the hard bottoming and thereby trim ring clamping action of the intermediate portions of the bead 32 is shown in Figure 3.

Circumferentially in line with the radially outer extremities of the bumps 40, the shoulder flange 37 is sufficiently radially inwardly offset therefrom to afford ample clearance for relatively free axial passage of the intermediate inwardly flexed portions of the hub cap bead 32 in applying or removing the hub cap 28. Due to the axially inward general convergence of the cam shoulders 41 and the shoulder 37, the flexure clearance for the intermediate portions of the bead rapidly diminishes until when the bead is substantially in the bump-base grooves 42 only such slight radially inward deflection is permitted that the intermediate portions of the bead 32 bear strongly against the shoulder 37 and counter-stretch toward the original diameter of the beaded hub cap margin. As a result, the portions of the bead engaging the bump shoulders 41 are drawn tightly against these shoulders. Thus, while the inward incline of cam shoulders 41 causes the tensioned hub cap bead 32 to draw dawn into the base groove 42, the base portion of the retainer shoulder 37 by counter-stretching the intermediate portions of the bead not only takes up slack in the bead tension after application of the hub cap, but actually tends to increase the tension and thereby the grip of the bead 32 on the bump shoulders 41 in the fully applied condition of the hub cap 28.

In order to clear the bumps 40, the internesting flange 38 of the trim ring is cut out or notched as indicated at 43 (Figure 5). The bottom edges of these notches 43 preferably clear the bump base grooves 42 but are formed on a common circumference which is on a smaller diameter than the common circle about the outermost extremities of the bumps 40, whereby the bumps will serve to hold the trim ring loosely in place temporarily before the hub cap 28 is applied. The resilience of the trim ring material permits the edges of the notches 43 to flex over the bumps in applying or removing the trim ring.

Generally axially extending edges 44 afforded by the notches 43 flank each side of each of the respective bumps 40 and hold the trim ring 27 against rotation relative to the attaching ring member 29.

Even though the adjacent edge of the bottoming flange 35 of the trim ring may be interposed between the body portion 34 of the attaching ring member and the bead 32 of the hub cap, the tendency of the bead to draw axially outwardly along the cam shoulders 41 provides adequate clearance therefor at the bumps so that there is no tendency of the interposed portion of the trim ring at the notches 43 to interfere with proper action of the bead at the bumps. Furthermore, since the axially outwardly protruding nose portions of the bumps 40 are located on such a substantially greater circumference than the normal internal diameter of the bead 32, there is established an exceedingly positive attachment of the hub cap which is quite free from any tendency of the hub cap to pop off or to be knocked off upon engagement with obstructions in the operation of the vehicle. A deliberate pry-off action with a pry-off tool is demanded in order to dislodge the hub cap. In fact, such dislodging pry-off must be effected adjacent to one of the bumps 40 so as to stretch the bead 32 over such bumps, since any attempt to pry off the hub cap at an intermediate point will only effect a tighter grip of the bead against the adjacent bumps 40.

By having the marginal flange 35 of the resilient and deflectable trim ring 27 fully backed up by the complementally shaped body portion 34 of the attaching ring member, the trim ring member is not only held firmly in position, but is also relieved from undue bending stresses when the trim ring is opened by swingably deflecting any selected portion thereof axially outwardly and radially inwardly substantially as indicated in broken outline in Figure 2. In this action, the deflected portion of the trim ring swings about or on a rounded junctured portion 44 where the major body of the trim ring joins the marginal seating flange 35. In effect, the rounded juncture 44 affords a strong resilient spring hinge which, due to its inherent resiliency and curvature, adequately distributes bending stresses over a substantial contiguous area and thus minimizes liability of fatigue failure due to repeated flexure or opening of the cover. This hinge expedient operates with equal effectiveness when the cover is deflected inwardly at any point as, for example, adjacent to the valve stem 24 when it is desired to have greater clearance for the outer end of the valve stem when applying an air hose thereto, or the like. Bending stresses in the opening movement of the cover are also further dissipated adjacent to the hinge juncture 44 by a tendency of the relatively wide marginal seating flange 35 of the trim ring to swing axially outwardly with the adjacent extremely deflected portion of the trim ring and hinge portion 44. In view of the resilient form-sustaining character of the material of the trim ring 27, any portion thereof which is deflected will instantaneously snap back to original shape upon release of the deflecting pressure or pull thereon.

Acording to the present invention, the attaching ring member 29 is adapted to be self-attaching to the wheel 11, whereby to avoid any need for special attaching structure, such as clips, or special structures, among which may be mentioned grooves, bumps, or other configurations or openings of any sort in the wheel body 12 or the tire rim 13. To this end, the attaching ring member 29 is provided with a peripheral series of equidistantly spaced generally radially extending integral finger structures 45 so arranged and dimensioned with respect to the intermediate flange 20 of the tire rim as to be engageable with a biting grip with the flange 20 when the attaching ring 29 is pressed axially inwardly home on the wheel in mounting the cover 10 thereon. In the practical embodiment of the invention shown in the drawings, having reference in particular to Figure 6, six of the attaching fingers 45 have been found to give excellent results.

In order to attain a strong, positive and effective grip of the biting fingers 45 on the encircling intermediate tire rim flange 20, and yet render mounting of the attaching ring 29 a relatively simple and expeditious procedure, construction of the fingers 45 and their relation to the body of the attaching ring 29 is such as to afford a substantial degree of resilience in the fingers 45 with nonetheless adequate rigidity and biting characteristics, as well as such disposition as to engage the tire rim flange 20 as far axially inwardly as practicable. Acordingly, each of the biting fingers 45 is of quite substantial width, being preferably formed with a rounded edge in plan, directed radially outwardly and angled obliquely axially outwardly from a radially outwardly axially inwardly obliquely extending outer marginal flange 47 on the attaching ring member. Each finger 45 is joined at each opposite side with the adjacent fingers by integral connecting web or flange portions 48 in common plane therewith.

As best seen in Figure 2, the inward extent of the attaching ring flange 47 is such that, when the radially inner portion of the attaching ring body 34 is seated against the radially outer side of the wheel body nose portion 14, the radially outer edge of the flange 47 will extend deep into a tire rim, certain of said fingers being disposed at a radially outwardly and axially outwardly oblique angle of approximately 24°, the remainder of the fingers being disposed at an oblique radially outwardly and axially outwardly oblique angle of approximately 16½°.

9. In a wheel structure, a cover member, a retaining annulus supporting said cover member and having a generally radially and axially outwardly extending annular flange formed with a valve-stem clearing notch, and a circumferential plurality of spaced biting fingers extending generally radially and axially outwardly in substantially a plane with said flange including a pair of fingers flanking said notch and extending at approximately 24° obliquely radially and axially outwardly, the remaining fingers extending obliquely radially and axially outwardly approximately 16½°.

10. In a wheel cover, a circular member having a plurality of generally radially extending biting fingers adapted for biting engagement with an axially extending intermediate flange of a tire rim, certain of said fingers being formed at a different angle than the remaining fingers to accommodate variance in deflection due to cocking placement of the circular member in mounting the same upon a wheel.

GEORGE ALBERT LYON.

REFERENCES CITED

The following references are of record in the file of this patent:

UNITED STATES PATENTS

| Number | Name | Date |
|---|---|---|
| 1,920,575 | Lyon | Aug. 1, 1933 |
| 2,263,243 | Lyon | Nov. 18, 1941 |
| 2,326,788 | Lyon | Aug. 17, 1943 |
| 2,368,230 | Lyon | Jan. 30, 1945 |
| 2,368,241 | Lyon | Jan. 30, 1945 |